(12) United States Patent
Hall

(10) Patent No.: US 8,141,915 B2
(45) Date of Patent: Mar. 27, 2012

(54) MODULAR ROTARY CONNECTION SYSTEM WITH A SEPARATE LOCKING PIECE

(75) Inventor: Matthew Charles Everard Hall, Littleton, CO (US)

(73) Assignee: Norgren, Inc., Littleton, CO (US)

( * ) Notice: Subject to any disclaimer, the term of this patent is extended or adjusted under 35 U.S.C. 154(b) by 515 days.

(21) Appl. No.: 12/374,341

(22) PCT Filed: May 31, 2006

(86) PCT No.: PCT/US2006/030071
§ 371 (c)(1),
(2), (4) Date: Jan. 19, 2009

(87) PCT Pub. No.: WO2008/016352
PCT Pub. Date: Feb. 7, 2008

(65) Prior Publication Data
US 2009/0250929 A1    Oct. 8, 2009

(51) Int. Cl.
*F16L 21/02* (2006.01)
(52) U.S. Cl. ........ 285/360; 285/203; 285/330; 285/396; 285/401; 285/913
(58) Field of Classification Search ............... 285/332.4, 285/201, 202, 203, 394–396, 330, 360, 361, 285/401, 402, 913, 921, 325; 137/884; 403/349; 439/311, 314, 316, 318, 332, 335, 286, 644, 439/673
See application file for complete search history.

(56) References Cited

U.S. PATENT DOCUMENTS

| 4,070,045 | A |   | 1/1978  | Colter et al. |
| 4,142,769 | A | * | 3/1979  | Wood ............................ 439/271 |
| 4,146,288 | A | * | 3/1979  | Ramsay et al. ............... 439/316 |
| 4,702,503 | A | * | 10/1987 | von Koch ...................... 285/330 |
| 4,782,852 | A |   | 11/1988 | Legris |
| 5,141,259 | A |   | 8/1992  | Highlen et al. |
| 5,555,929 | A | * | 9/1996  | Ishikawa ......................... 165/76 |
| 5,667,251 | A | * | 9/1997  | Prest ................................ 285/12 |
| 6,143,983 | A | * | 11/2000 | Burton et al. ................. 174/669 |
| 6,302,617 | B1| * | 10/2001 | Rumpp ......................... 403/348 |
| 6,733,221 | B2| * | 5/2004  | Linger ............................ 411/84 |

(Continued)

FOREIGN PATENT DOCUMENTS

| EP | 1321698 A2 | 6/2003 |
| FR | 1483541 A  | 6/1967 |

(Continued)

*Primary Examiner* — James Hewitt
*Assistant Examiner* — Jay R Ripley
(74) *Attorney, Agent, or Firm* — The Ollila Law Group LLC

(57) ABSTRACT

A modular coupling system comprises a connector (200, 201) having a generally cylindrical center section (224) with a bore (208) extending from a front face (206) of the connector (200, 201) through to a back side of the connector. The connector (200, 201) has a first (220) and a second wing (222) extending from the generally cylindrical center section (224) of the connector (200, 201). A first flange (202) extends from a front side of the first wing towards a top side of the connector (200, 201), and a second flange (204) extends from a back side of the first wing towards a bottom side of the connector (200, 201). A third flange (202) extends from a front side of the second wing towards the bottom side of the connector (200, 201), and a second flange (204) extends from a back side of the first wing towards the top side of the connector (200, 201).

15 Claims, 18 Drawing Sheets

U.S. PATENT DOCUMENTS

| | | | |
|---|---|---|---|
| 7,078,623 B1 * | 7/2006 | Sheehan | 174/665 |
| 7,131,201 B2 | 11/2006 | Morgensai et al. | |
| 7,325,286 B2 | 2/2008 | Bormioli | |
| 7,451,778 B2 * | 11/2008 | Bordonaro et al. | 137/269 |
| 2003/0075921 A1 | 4/2003 | Davidson | |
| 2004/0033711 A1 * | 2/2004 | Loveless et al. | 439/314 |
| 2005/0051750 A1 * | 3/2005 | Morin | 251/149.9 |

FOREIGN PATENT DOCUMENTS

| | | |
|---|---|---|
| KR | 19970002333 | 3/1997 |
| KR | 20020084071 | 11/2002 |
| KR | 20050106470 | 11/2005 |
| KR | 20060047922 | 5/2006 |
| WO | WO-99/02234 A | 1/1999 |

\* cited by examiner

MODULAR ROTARY CONNECTION SYSTEM WITH A SEPARATE LOCKING PIECE

CROSS-REFERENCES TO RELATED APPLICATIONS

This application is a U.S. national phase application filed under 35 U.S.C. §371 and based on International Patent Application No. PCT/US06/30071, filed May 31, 2006.

BACKGROUND OF THE INVENTION

1. Field of the Invention

The invention is related to the field of connectors and fittings, and in particular, to a modular rotary connection system.

2. Description of the Prior Art

The connecting systems used to couple fluid components together have evolved over time. Fluid components include, but are not limited, to: pneumatic components, hydraulic components, $CO_2$ components, oxygen components, natural gas components, hydrogen components, and the like. At one time, tapered threaded pipe nipples were used in-between the different components. Newer clamping systems that couple to ported flanges on the different components, replaced the tapered threaded pipe nipples. The newer clamping systems typically only used one or two screws to fasten the components together. This reduced the assembly time for a system. FIG. 1a is a drawing of a clamping system configured to couple to the ported flanges on two components. The newer clamping systems originally fit between the different components and therefore increased the overall width of the assembly. Recently, a clamping system that allows the two components to touch has been developed. These types of clamping system do not add any width to the assembly and have been called zero space clamping systems. FIG. 1b is a drawing of a zero space clamping system. Unfortunately, even the zero space clamping systems still use screws to clamp the components together with a pressure tight seal. This requires the use of tools to clamp and un-clamp the components.

Tapered threaded ports may still be used on the ends of the pneumatic and hydraulic components to install the components into a piping system. These threaded ports may be provided in a variety of thread types, for example NPT, ISO G and ISO Rc. Customers typically install a fitting into the tapered pipe thread, for example a quick connect fitting, a push to connect fitting, a barb fitting, or the like. Installation of this fitting adds a part, adds installation time, increases the width of the assembly, and adds another potential leak point. In addition, the inventory for the manufacture is increased by requiring the manufacture to stock each component in the different thread formats.

Therefore there is a need for a modular connecting system that can be used for attaching components together and attaching endcaps, containing the desired fitting type, to the ends of the assembled components.

SUMMARY OF THE INVENTION

A modular coupling system comprises a connector (200, 201) having a generally cylindrical center section (224) with a bore (208) extending from a front face (206) of the connector (200, 201) through to a back side of the connector. The connector (200, 201) has a first (220) and a second wing (222) extending from the generally cylindrical center section (224) of the connector (200, 201). A first flange (202) extends from a front side of the first wing towards a top side of the connector (200, 201), and a second flange (204) extends from a back side of the first wing towards a bottom side of the connector (200, 201). A third flange (202) extends from a front side of the second wing towards the bottom side of the connector (200, 201), and a fourth flange (204) extends from a back side of the second wing towards the top side of the connector (200, 201).

Aspects

One aspect of the invention includes a modular coupling system, comprising:

a connector (200, 201) having a generally cylindrical center section (224) with a bore (208) extending from a front face (206) of the connector (200, 201) through to a back side of the connector, the connector (200, 201) having a front half and a back half;

the connector having a first (220) and a second wing (222) extending radially from the generally cylindrical center section (224) of the connector (200, 201);

a first and second flange (202) on the front half of the connector where the first flange extends from a front side of the first wing (220) towards a top side of the connector and the second flange (202) extends from the front side of the second wing (222) towards a bottom side of the connector;

a third and fourth flange (204) on the back half of the connector where the third flange (204) extends from a back side of the first wing (220) towards the bottom side of the connector, and the fourth flange (204) extends from the back side of the second wing (222) towards the top side of the connector.

Preferably, a first shoulder (210) concentric with the bore (208) and extending above the front face (206) of the connector and a second shoulder concentric with the bore and extending above the back side of the connector.

Preferably, the first wing (220) and the second wing (222) extend in opposite directions from the generally cylindrical center section (224) of the connector.

Preferably, a first snap opening in an end of the first wing (220);

a second snap opening (217) in an end of the second wing (222).

Preferably, an inner surface (205) of the first, second, third and fourth flanges has been tilted away from vertical.

Preferably, a first set of alignment tabs (280) located on an end of the first and second flanges (202) where a front face of the first set of alignment tabs extends above the front face (206) of the connector;

a second set of alignment tabs (282) located on the ends of, and near a bottom surface of, the first and second flanges (202) where a front face of the second set of alignment tabs (282) extends above the front face (206) of the connector and where the front surface of the first set of alignment tabs (280) and the front surface of the second set of alignment tabs (282) form a plane.

Preferably, a first set of alignment tabs (280) located on an end of the first and second flanges (202) where a top face of the first set of alignment tabs (280) is configured to align the connector (201) with respect to a mating part in rotation about a cylindrical axis of the bore (208).

Preferably, a front half of the connector is a mirror image of the back half of the connector when rotated 180 degrees about an axis perpendicular to a cylindrical axis of the bore and parallel with the first and second wings.

Preferably, two mating parts where each mating part has a connector opening where the connector opening comprises:

a slot having a bottom surface (336) with a circular hole (332) formed in the bottom surface (336);

the slot having a top edge forming a semi-circular area in a middle section of the top edge where the semi-circular area is concentric with the circular hole, a left side of the top edge forms a lug projecting downward from the edge where a channel is formed between the lug and the bottom surface of the slot;

the slot having a bottom edge forming a semi-circular area (338) in a middle section of the bottom edge where the semi-circular area (338) is concentric with the circular hole (332), a right side of the bottom edge forms a lug (344) projecting upward from the edge where a channel (334) is formed between the lug (344) and the bottom surface (336) of the slot.

Preferably, each mating part is selected from the group: a filter, a regulator, a lubricator, a valve, a sensor, a pressure switch, a fluid control device or a fluid power device.

Preferably, a locking tab (550) sized to fill a gap (G) formed between a bottom edge (292) of the first flange and the right side of the top edge (335) of the slot when the connector is installed in one of the two connector openings.

Preferably, the locking tab (550) is attached to a front face of a locking key (500, 1100).

Preferably, a snap (552) is attached to the front face of the locking key (500, 1100).

Preferably, a second locking tab (550) is attached to the front face of the locking key (500).

Preferably, the locking tab is attached to a front face of a cover (1200).

Preferably, the locking tab (550) has at least one side flange (1259) running from a bottom of the locking tab to a top of the locking tab and configured to fit into a key slot (207, 337).

Preferably, the connector is a zero space connector.

Preferably, the front half of the connector has been scaled up from the back half of the connector.

Preferably, the back half of the connector has been replaced with a fitting formed concentric with the bore where the fitting is selected from the group: a male quick connect fitting, a push to insert fitting, a female quick connection, a barb connection, a swivel fitting.

Preferably, the back half of the connector has been replaced with an endcap with a pipe thread formed into the bore.

Preferably, a third wing extending radially from the generally cylindrical center section of the connector where the first, second and third wing are equally spaced around the generally cylindrical center section of the connector;
a fifth flange on the front half of the connector where the fifth flange extends from a front side of the third wing in a clockwise direction;
a sixth flange on the back half of the connector where the sixth flange extends from a back side of the third wing in a counter-clockwise direction.

Another aspect of the invention comprises a method of assembling a modular fluid component system, comprising:
inserting a first end of a connector (200, 201) into a connector opening in a first component;
rotating the connector (200, 201) with respect to the component;
inserting a second end of the connector (200, 201) into a connector opening in a second component;
rotating the connector (200, 201) with respect to the second component such that the first and second components are coupled together;
inserting a first locking tab (550) into a first gap (G) between the first end of the connector and the first component and inserting a second locking tab (550) into a second gap (G) between the second end of the connector and the second component thereby preventing rotation of the first component with respect to the connector and preventing rotation of the second component with respect to the connector.

DETAILED DESCRIPTION OF THE PREFERRED EMBODIMENT

FIGS. 2-12 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1A:
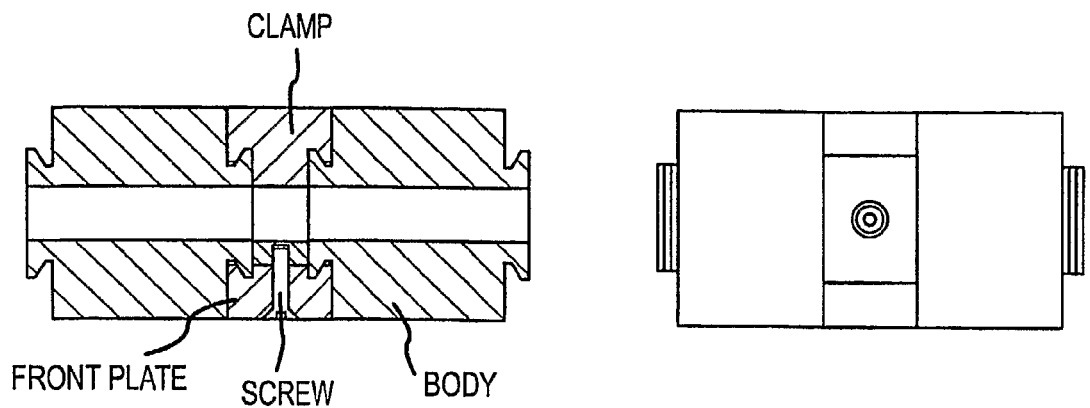
FIG. 1a is a drawing of a prior art clamping system configured to couple to the ported flanges on two components.
Figure 1B:
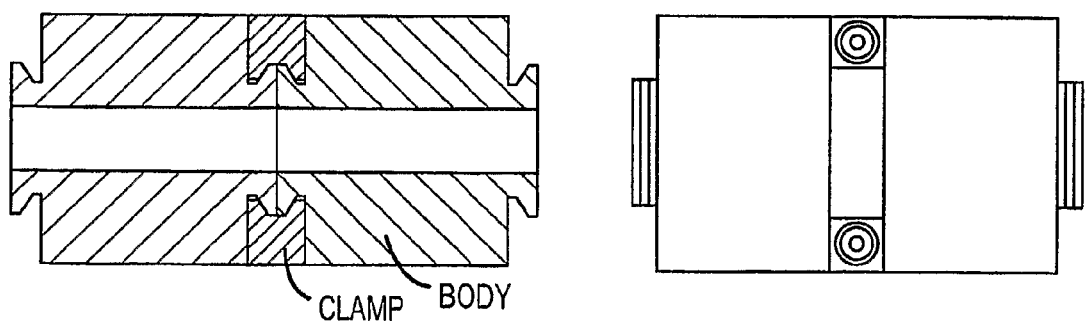
FIG. 1b is a drawing of a prior art zero space clamping system.
Figure 2A:
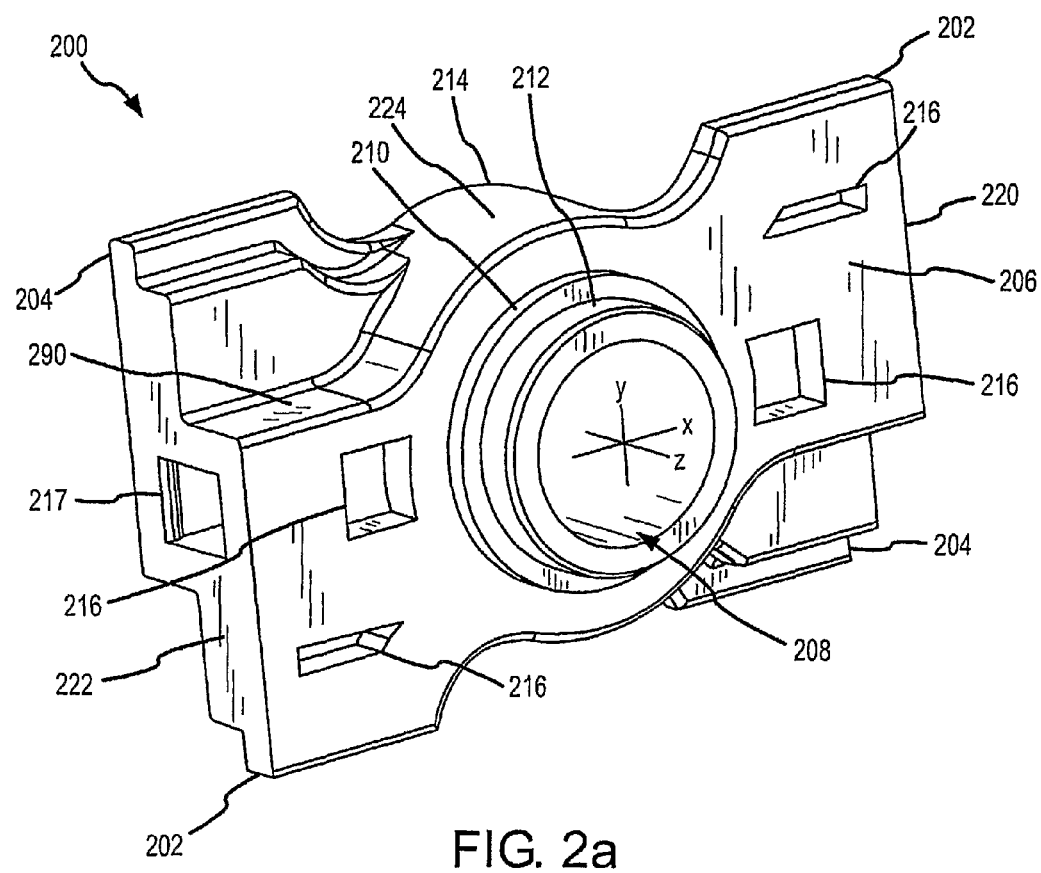
FIG. 2a is an isometric view of a rotating connector 200 in an example embodiment of the invention.

FIG. 2a is an isometric view of a rotating connector 200 in an example embodiment of the invention. Rotating connector 200 may also be called a rotating coupler. In one example embodiment of the invention, rotating connector 200 has a generally cylindrical center section 224 with two wings (220 and 222) projecting from each side of the cylindrical section 224. In other example embodiments of the invention, more than two wings may be used. In one example embodiment of the invention the wings are evenly spaced around the cylindrical section. A bore 208 passes through the cylindrical part of rotating connector 200 from a front face 206 to a back face (not shown). A first shoulder 210 surrounds the bore 208 and extends above front face 206. A second shoulder 212, smaller in diameter than shoulder 210, may also surround bore 208, and extends above shoulder 210. The back side of rotating connector also has shoulders surrounding the bore 208 and extending above the back face (not shown). Each wing (220 and 222) has two flanges formed into the wing. A front flange 202 is on the front face 206 of the rotating connector 200. A back flange 204 is located on the back side of rotating connector 200. The right wing 220 has the front flange 202 projecting upward from the wing towards the top of rotating connector 200, and has the back flange 204 projecting downward from the wing towards the bottom of rotating connector 200. The left wing 222 has the front flange 202 projecting downward from the wing towards the bottom of rotating connector 200, and has the back flange 204 projecting upward from the wing towards the top of rotating connector 200. Each flange has a bottom surface. The bottom surface 290 of flange 202 can be seen in FIG. 2a. A snap opening 217 may be formed in each end of the two wings. Optional voids 216 are spaced around rotating connector and are used to lighten the rotating connector 200 and to maintain proper wall thicknesses in rotating connector 200. In one example embodiment of the invention, the front half of rotating connector 200 is a mirror image of the back half of rotating connector 200, rotated 180 degrees about the X or Y axis.

Figure 2B:
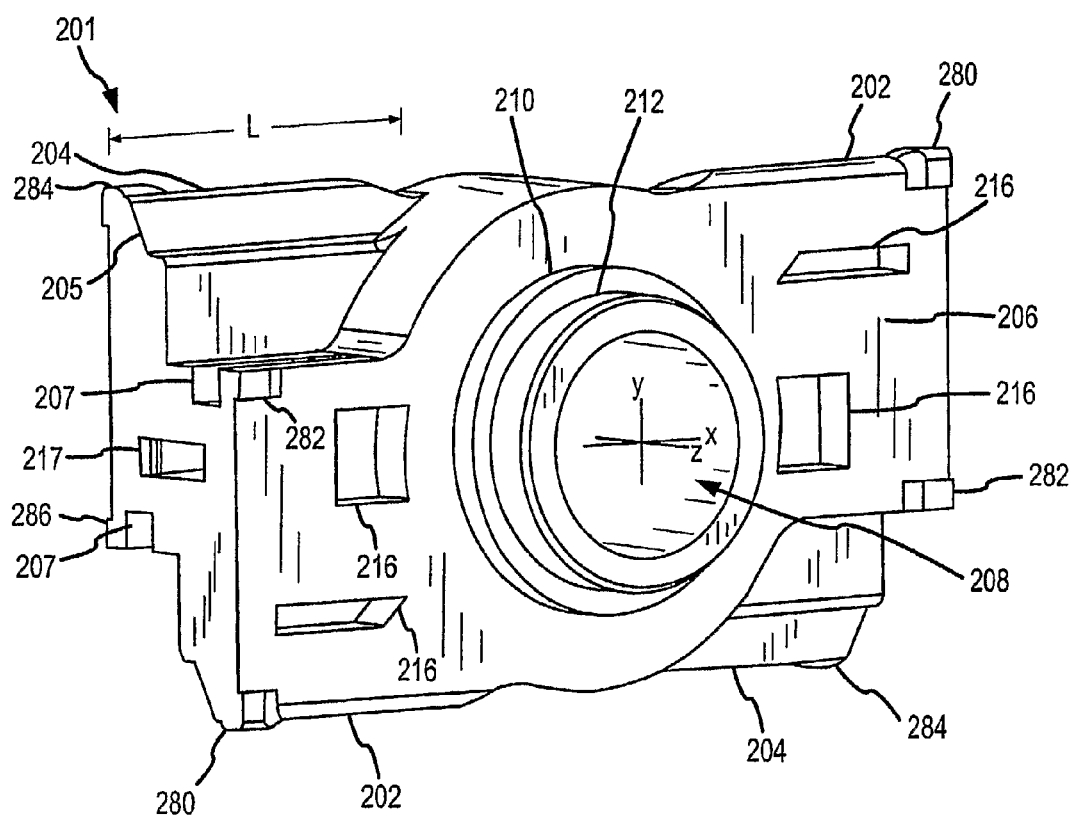
FIG. 2b is an isometric view of rotating connector 201 in another example embodiment of the invention.

FIG. 2b is an isometric view of rotating connector 201 in another example embodiment of the invention. Rotating connector 201 has a generally cylindrical center section with two wings projecting from each side of the cylindrical section. In other example embodiments of the invention, more than two wings may be used. In one example embodiment of the invention the wings are evenly spaced around the cylindrical section. A bore 208 passes through the cylindrical part of rotating connector 201 from a front face 206 to a back face (not shown). A first shoulder 210 surrounds the bore 208 and extends above front face 206. A second shoulder 212, smaller in diameter than shoulder 210, may also surround bore 208, and extends above shoulder 210. The back side of rotating connector also has shoulders surrounding the bore 208 and extending above the back face (not shown). Each wing has two flanges formed into the wing. A front flange 202 is on the front face 206 of the rotating connector 201. A back flange 204 is located on the back side of rotating connector 201. The right wing has the front flange 202 projecting upward from the wing towards the top of rotating connector 201, and has the back flange 204 projecting downward from the wing towards the bottom of rotating connector 201. The left wing has the front flange 202 projecting downward from the wing towards the bottom of rotating connector 201, and has the back flange 204 projecting upward from the wing towards the top of rotating connector 201. A snap opening 217 may be formed in each end of the two wings. Optional voids 216 are spaced around rotating connector 201 and are used to lighten the rotating connector 201 and to maintain proper wall thicknesses in rotating connector 201. In one example embodiment of the invention, the front half of rotating connector 201 is a mirror image of the back half of rotating connector 201, rotated 180 degrees about the X or Y axis.

Rotating connector 201 (FIG. 2b) has a number of changes with respect to rotating connector 200 (FIG. 2a). The inner edges of the flanges have been tilted away from a vertical orientation. Inner edge 205 on the back flange of the left wing can be seen in FIG. 2b. Alignment tabs have been added to each flange. The two front flanges 202 on the left and right wings have an alignment tab 280 located at the tip of the flanges. Two additional alignment tabs 282 are located on front surface 206 at the base of each flange 202. The front face of alignment tabs 280 and 282 project above the front surface 206 of the rotating connector 201. When rotating connector 201 is installed into a mating part, the front faces of the alignment tabs contact the mating part and establish the orientation between the two parts. The top face of alignment tabs 280 and the axis of rotation of shoulder 212, establish the angular orientation of the rotating connector with respect to the mating part, when the rotating connector is installed into a mating part. Alignment tabs 280 and 282 have small surface areas compared to the surface area of front face 206 or compared to the top surface of flanges 202 and 204. By reducing the surface area used to reference rotating connector 201 with respect to a mating part, the tight tolerance areas have been reduced. It is a lot easier to keep a small area flat and in a narrow tolerance range than it is to keep a large area flat and in a narrow tolerance range. Similar alignment tabs (284 and 286) have been added to the two back flanges 204. Key slots 207 have been added into the bottom surface of each flange.

Figure 2C:
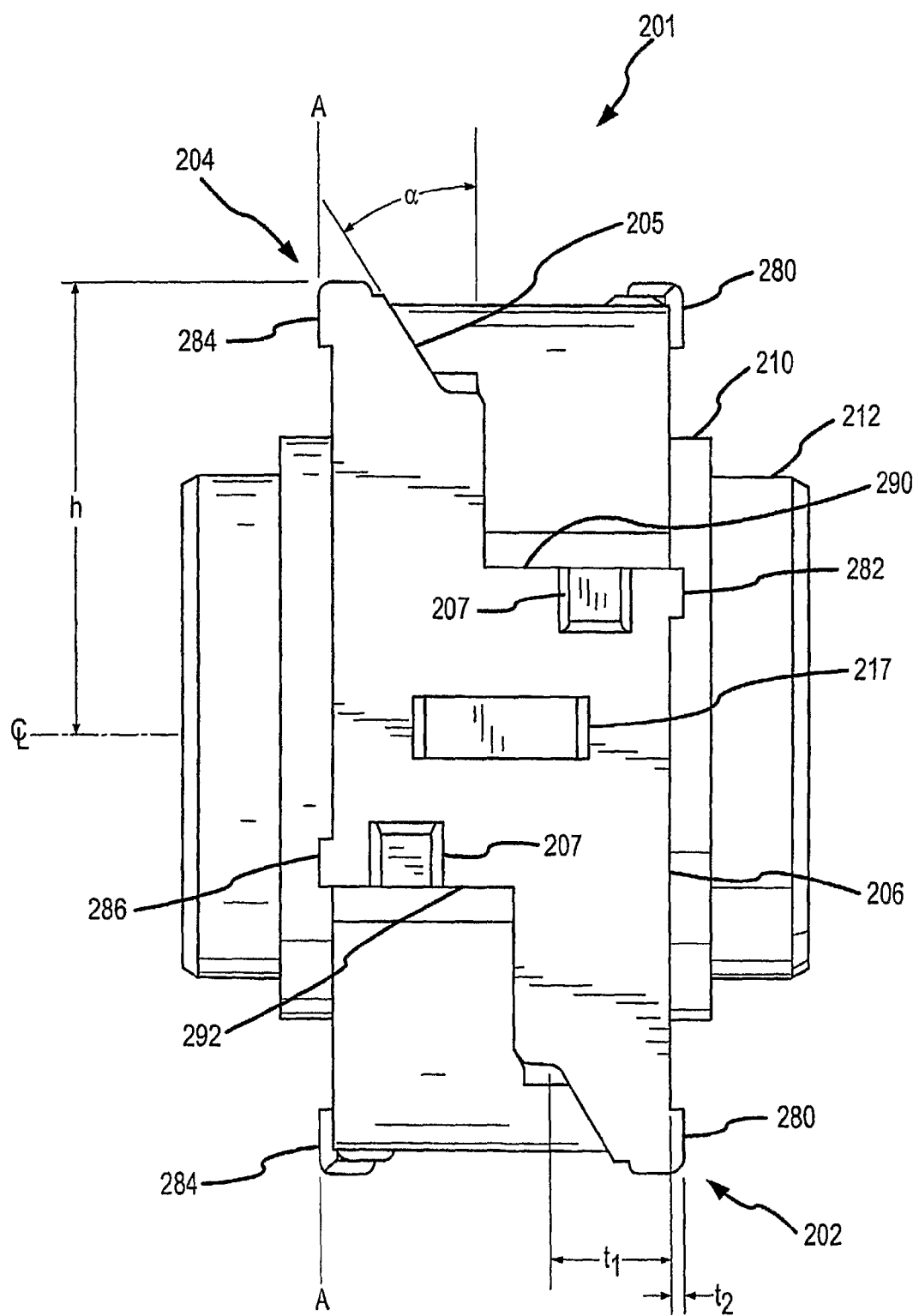
FIG. 2c is a side view of rotating connector 201 in an example embodiment of the invention.

FIG. 2c is a side view of rotating connector 201 in an example embodiment of the invention. FIG. 2c shows the end of the left wing with back flange 204 at the top left of FIG. 2c and front flange 202 at the bottom right of FIG. 2c. The inner edges of the flanges have been tilted away from vertical by angle $\alpha$, as can be seen on inner surface 205 on the back flange 204. By tilting the inner surface of the flange away from vertical, the thickness t1 at the base of the flanges can be increased. This increases the strength of the flanges and may allow the connector to hold parts together over a wider pressure range. Alignment tabs 280 are formed on the top side of the front flanges 202 and alignment tabs 284 are formed on the top sides of back flanges 204. Alignment tabs 282 are formed on front face 206 and alignment tabs 286 are formed on the back face. The front face of alignment tab 280 extends above front surface 206 by distance t2. The top face of alignment tabs 280 and 284 extend above the centerline of rotating connector 201 by height h. The front faces of alignment tabs 284 and 286 form a plane AA. Plane AA defines the orientation of connector 201 with respect to the front face of a mating part (not shown). The front faces of alignment tabs 282 and 280 also form a plane. The bottom surface 292 of the back flange 204 and the bottom surface 290 of the front flange 202 are used to help lock the connector in place in the mating part, as will be explained further below. A key slot 207 has been formed into the bottom surface (290 and 292) of each flange.

Figure 3A:
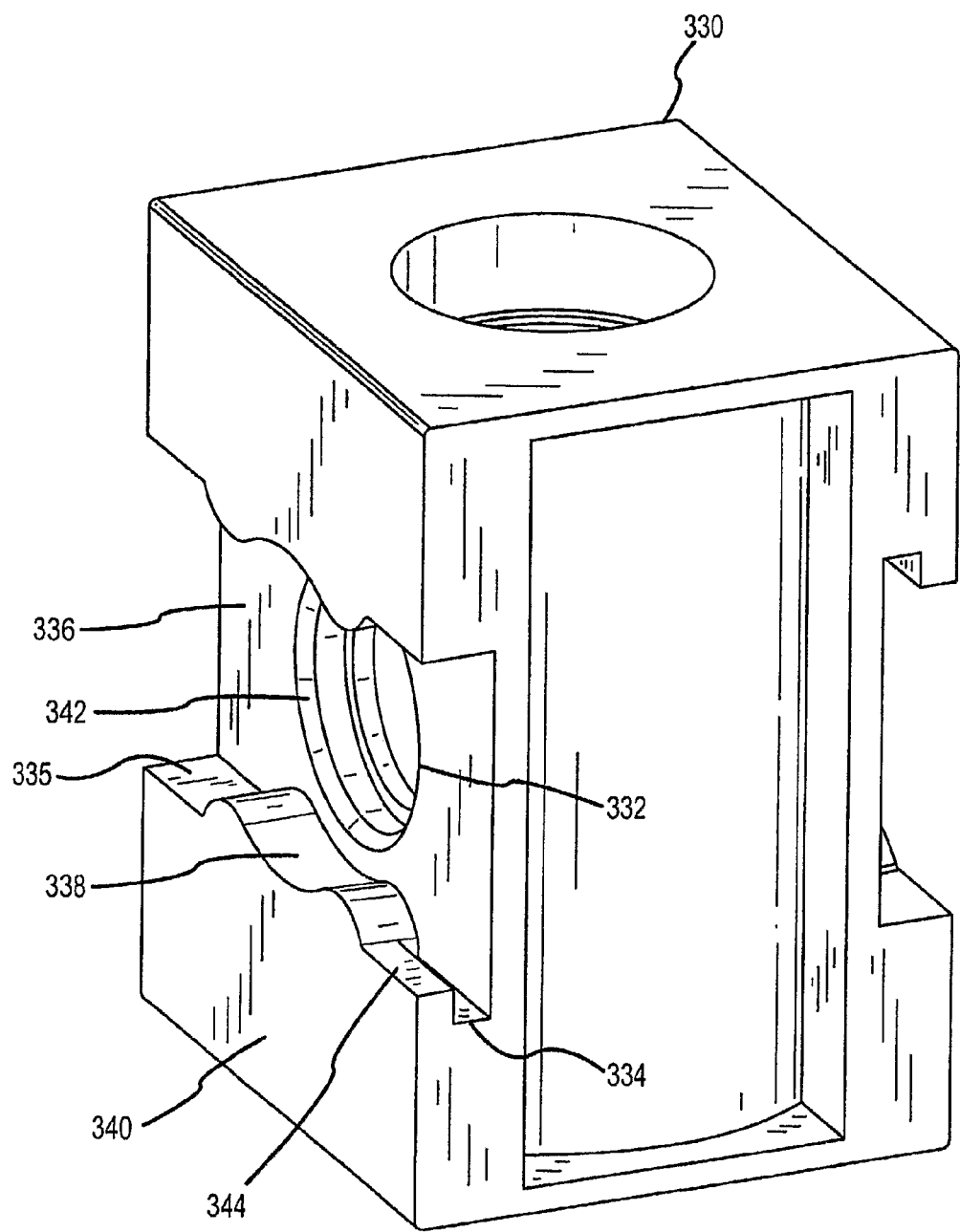
FIG. 3a is an isometric view of a connector opening for rotating connector 200 formed in the side of a system component 330 in an example embodiment of the invention.

FIG. 3a is an isometric view of a connector opening for rotating connector 200 formed in the side of a system component 330 in an example embodiment of the invention. The system component 330 with the connector opening is one of the mating parts for the rotating connector 200. The connector opening can be formed in any type of hydraulic or pneumatic component, for example a filter, a regulator, a lubricator, a pressure gauge, a valve, a sensor, a pressure switch, or the like. The sensors may be mechanical sensors or electronic sensors. The system components may also be water regulators or fluid control or fluid power devices. Each system component could have two connector openings, one connector opening on each side of the component. In one example embodiment of the invention the connector opening is in the general shape of a horizontal slot, but may take other shapes in other embodiments, for example a vertical slot. The connector opening has a face 336 on the bottom of the slot. A circular opening 332 is formed in face 336. An O-ring groove 342 may be formed on the inner surface of circular opening 332. Other sealing types may also be used, for example v-pak, u-cup or the like. The bottom edge of the slot has a bottom lug 344 formed on the right side of the bottom edge of the slot. A channel 334 is formed between the bottom lug 344 and the face 336. Flange 204 (or flange 202) from connector 200 fits into channel 334 when rotating connector 200 has been installed into mating part 330. Surface 335, formed on the left side of the bottom edge of the slot, is on the opposite side of the bottom edge from flange 344. The center of the bottom edge forms a partial circle 338 concentric with circular opening 332. The top edge of the slot has a top lug (not shown) formed on the left side of the top edge of the slot. A channel (not shown) is formed between the top lug and face 336. The center of the top edge also forms a partial circle concentric with circular opening 332.

Figure 3B:
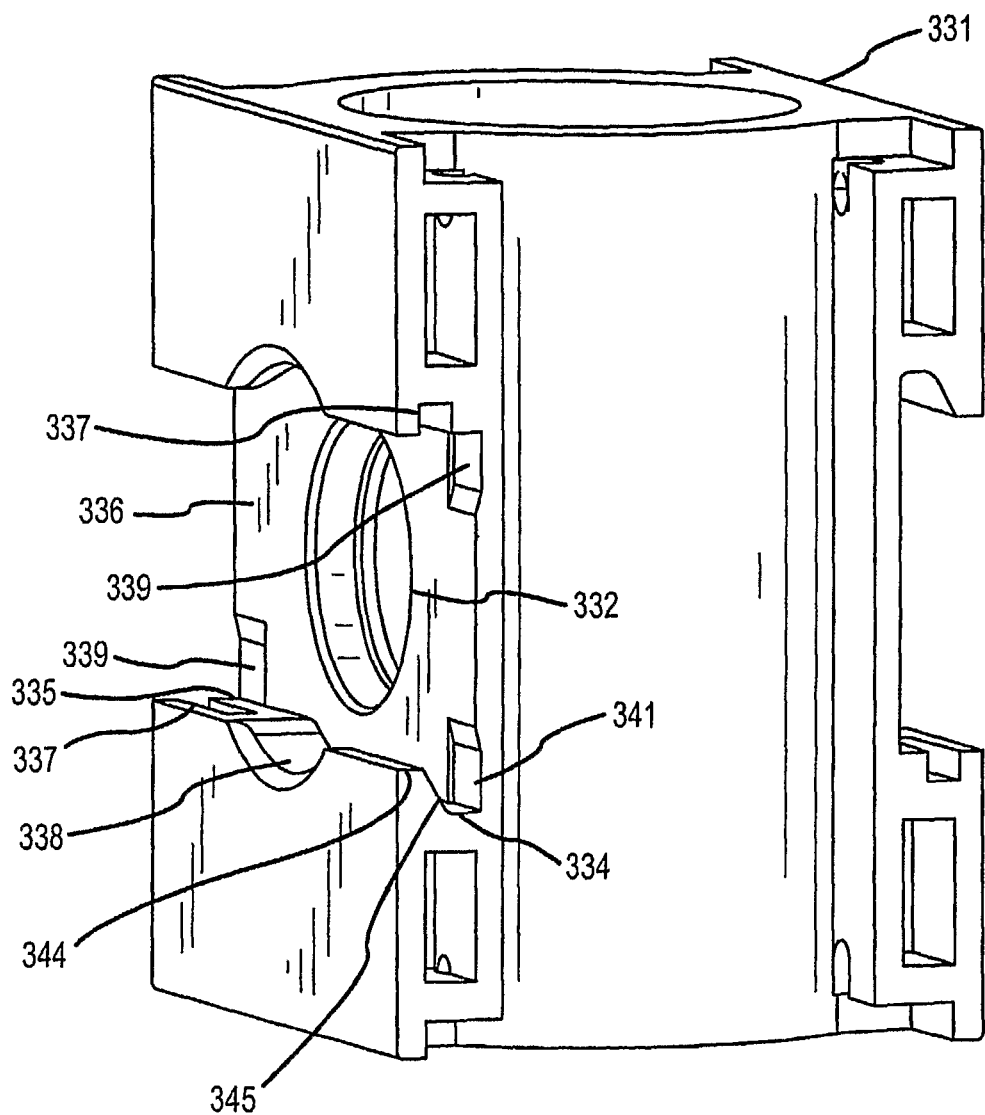
FIG. 3b is an isometric view of a connector opening for rotating connector 201 formed in the side of a mating part 331 in an example embodiment of the invention.

FIG. 3b is an isometric view of a connector opening for rotating connector 201 formed in the side of a mating part 331 in an example embodiment of the invention. The connector opening can be formed in any type of hydraulic or pneumatic component, for example a filter, a regulator, a lubricator, a pressure gauge, a valve, a sensor, a pressure switch, or the like. The sensors may be mechanical sensors or electronic sensors. The system components may also be water regulators or fluid control or fluid power devices. Each component could have two connector openings, one connector opening on a different side of the component. In one example embodiment of the invention the connector opening is in the general shape of a horizontal slot, but may take other shapes in other embodiments, for example a 45 degree slot. The connector opening has a face 336 on the bottom of the slot. A circular opening 332 is formed in face 336. The bottom edge of the slot has a bottom lug 344 formed on the right side of the bottom edge of the slot. The inner surface 345 of lug 344 is tilted away from vertical. A channel 334 is formed between the bottom lug 344 and the face 336. Flange 204 (or flange 202) from connector 201 fits into channel 334 when rotating connector 201 has been installed into mating part 331. Surface 335, formed on the left side of the bottom edge of the slot, is on the opposite side of the bottom edge of the slot with respect to flange 344. An optional key slot 337 may be formed in surface 335. The center of the bottom edge forms a partial circle 338 concentric with circular opening 332. The top edge of the slot has a top lug (not shown) formed on the left side of the slot. A channel (not shown) is formed between the top lug and the face 336. The center of the top edge also forms a partial circle concentric with circular opening 332. Two alignment surfaces 339 that correspond to alignment tabs 282 have been formed into face 336. Two other alignment surfaces 341 that correspond to alignment tabs 280 have been formed into surface 336.

Figure 4A:
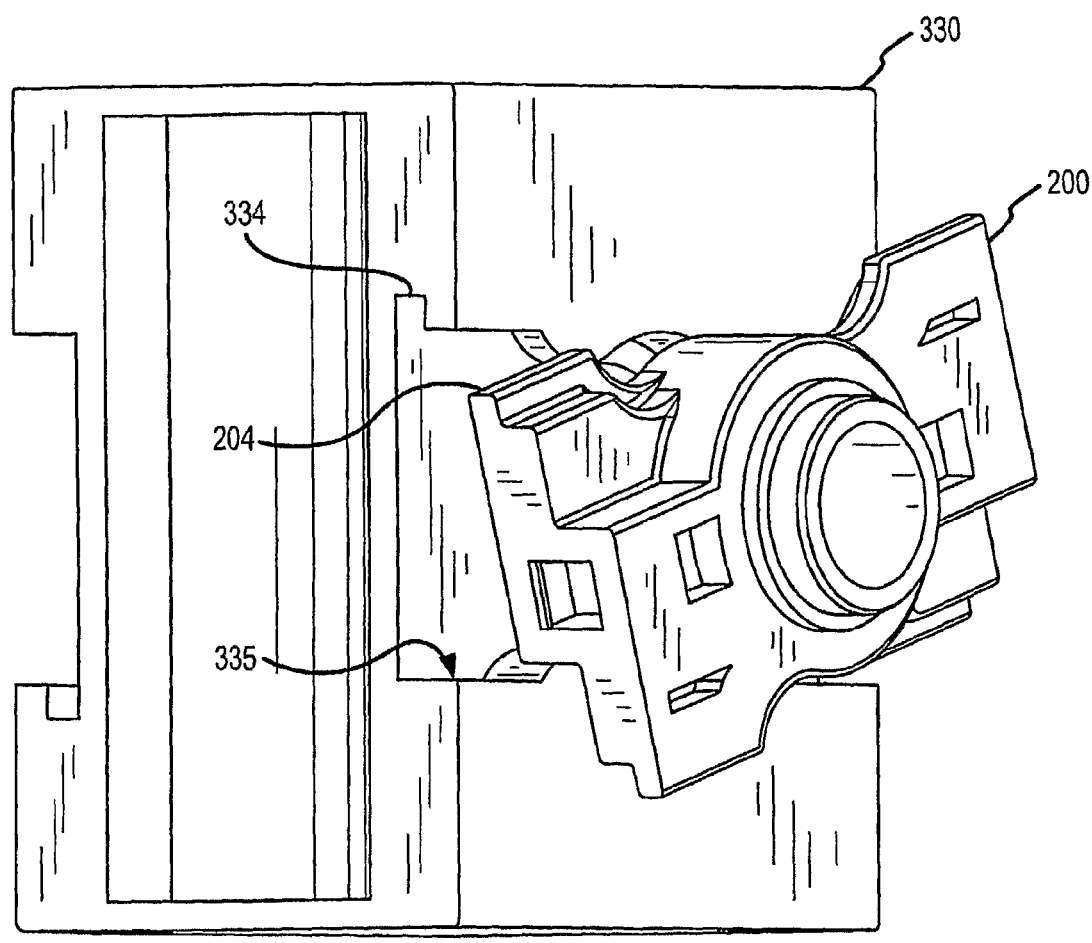
FIG. 4a is an isometric view of a rotating connector 200 being inserted into a mating part 330 in an example embodiment of the invention.
Figure 4B:
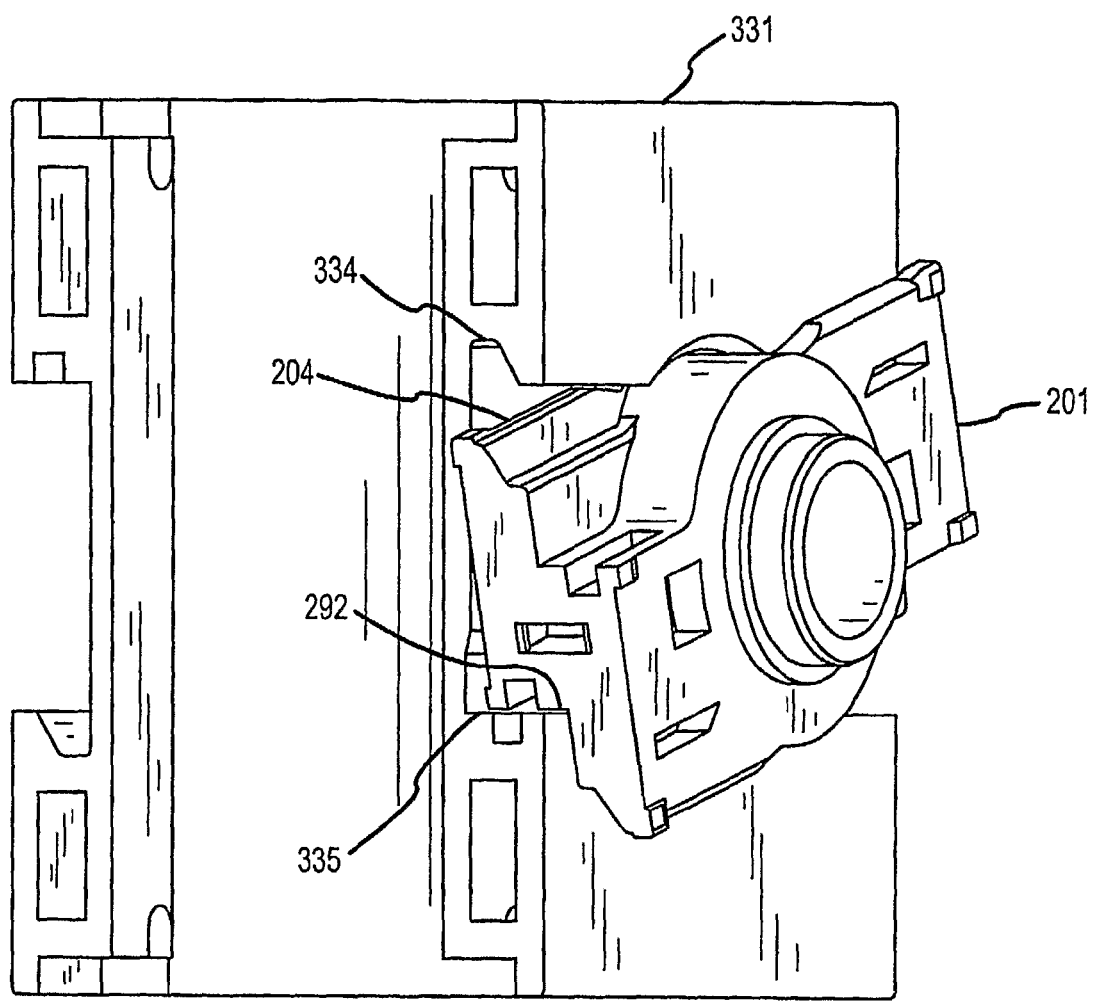
FIG. 4b is an isometric view of connector 201 inserted into a connector opening in mating part 331, in an example embodiment of the invention.
Figure 4C:
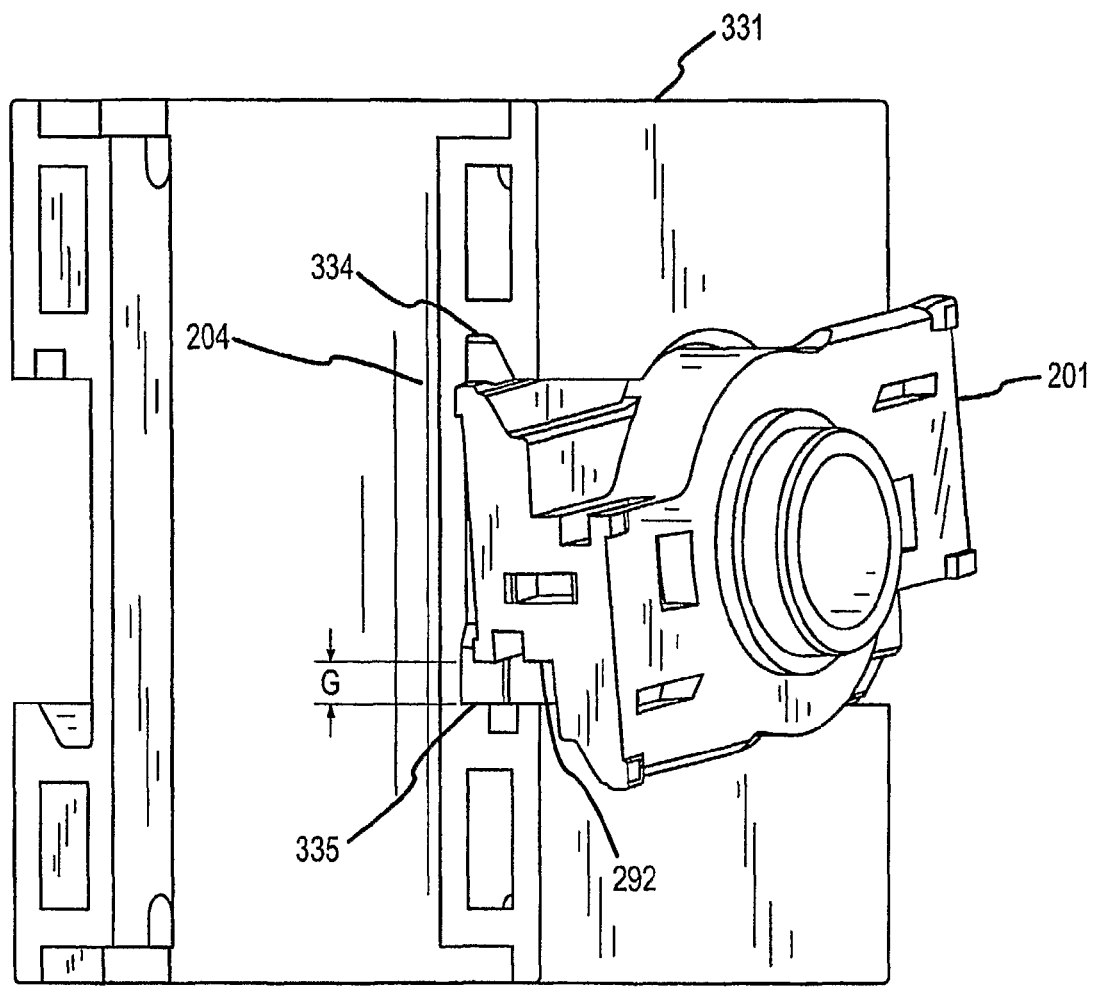
FIG. 4c is an isometric view of connector 201 inserted into a connector opening in mating part 331 and partially rotated, in an example embodiment of the invention.
Figure 4D:
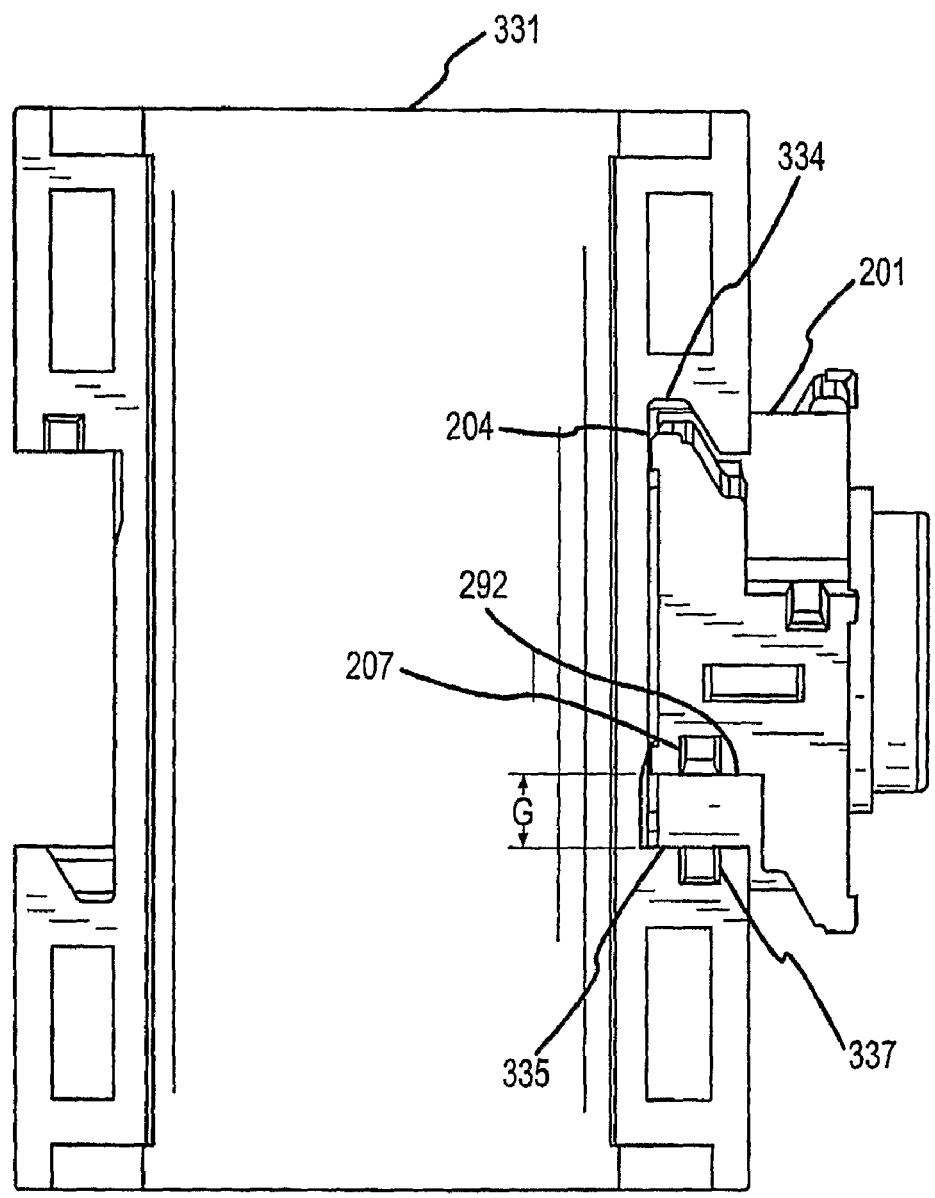
FIG. 4d is a side view of connector 201 inserted into a connector opening in mating part 331 and almost fully rotated, in an example embodiment of the invention.

To install a rotating connector into a mating part, the rotating connector is tilted or rotated slightly such that the flanges (202 or 204) on one end of the rotating connector align with the slot in the mating part. The shoulder 212 on the rotating connector fits into the circular opening 332 in the face 336 at the bottom of the slot. The cylindrical central section 224 of the connector mates with the partial concentric circle 338 on the top and bottom edge of the slot. FIG. 4a is an isometric view of a rotating connector 200 being inserted into a mating part 330. Once the rotating connector has been inserted into the connector opening the rotating connector is rotated with respect to the mating part. During the rotation of the connector with respect to the mating part, the flanges 204 on the rotating connector mate with, and fit into, the channels 334 in the top and bottom edge of the slot. FIG. 4b is an isometric view of connector 201 inserted into a connector opening in mating part 331, in an example embodiment of the invention. Connector 201 has been inserted into the connector opening formed in mating part 331, but has not yet been rotated. The bottom surface 292 of flange 204 may be touching surface 335 formed in the bottom edge of the slot and there is a large gap between the top of flange 204 and channel 334. As rotating connector 201 is rotated closer towards its final position (as shown in FIG. 4c) a gap G forms between surface 335 and the bottom 292 of flange 204 and flange 204 fills channel 334. FIG. 4d is a side view of rotating connector 201 almost fully rotated into mating part 331 in an example embodiment of the invention. Gap G has almost reached its maximum size and flange 204 has almost filled channel 334.

Figure 5:
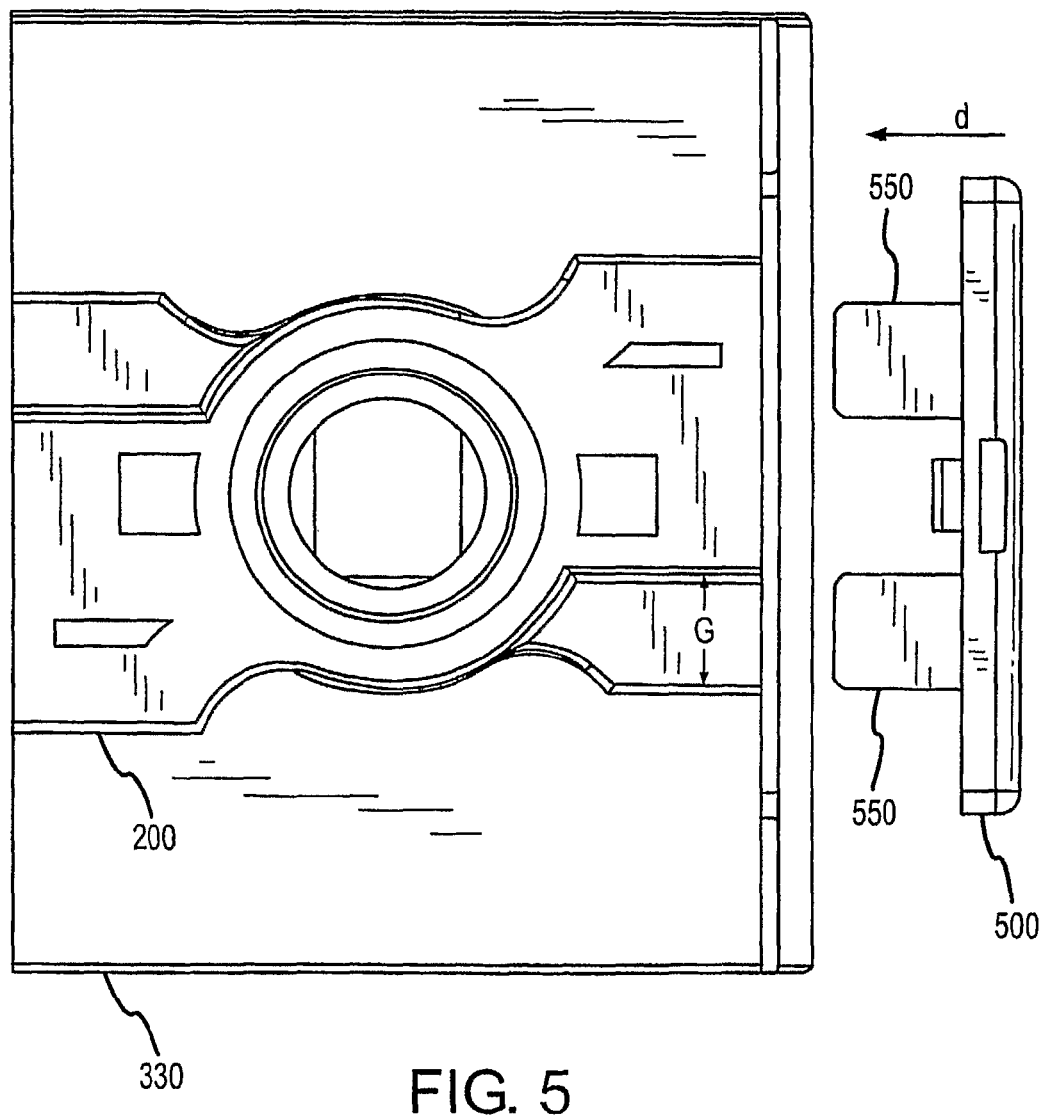
FIG. 5 is a side view of a rotating connector system in an example embodiment of the invention.
Figure 6:
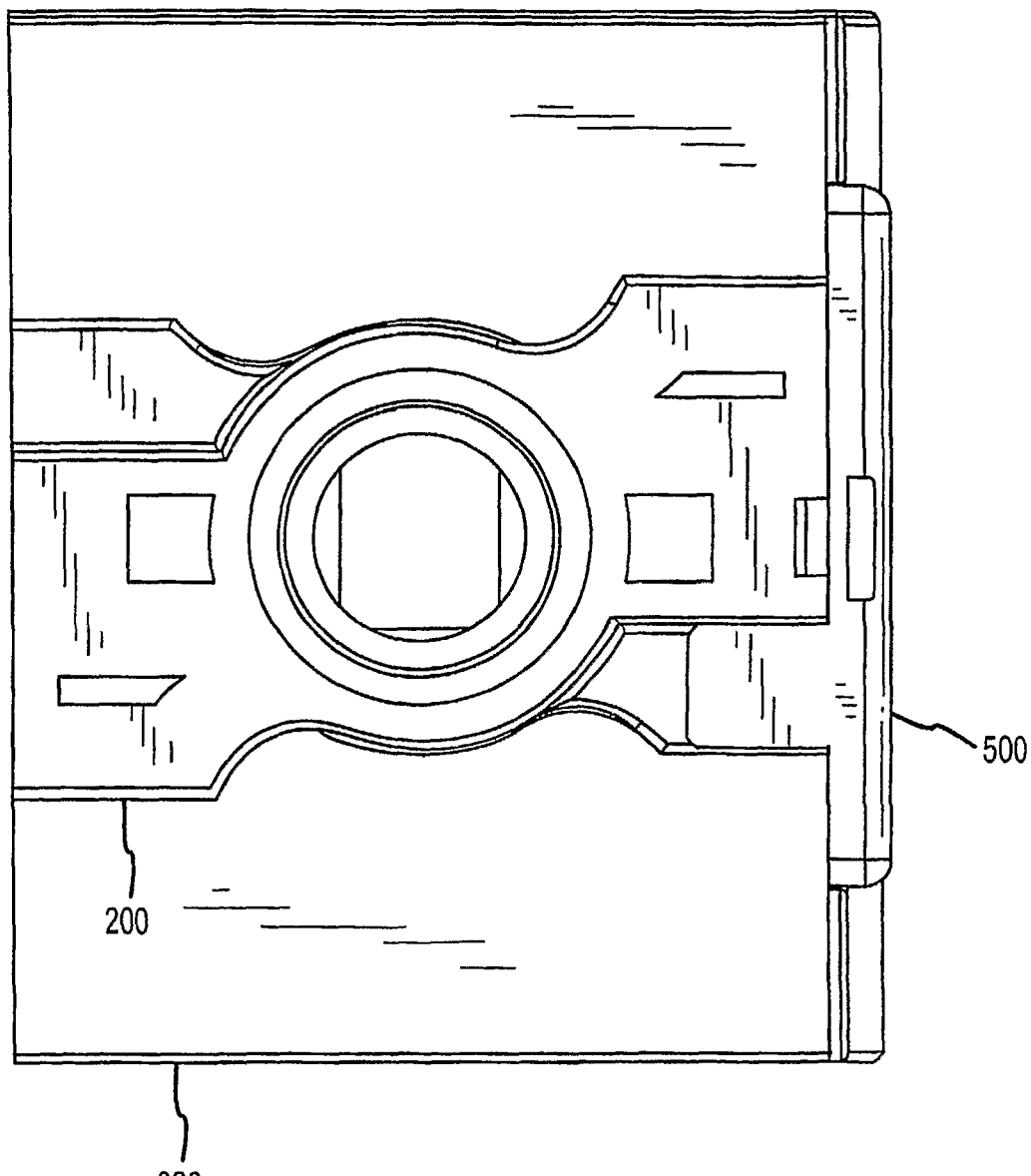
FIG. 6 is a side view of a rotating connector system in an example embodiment of the invention.

FIG. 5 is a side view of a rotating connector system in an example embodiment of the invention. Rotating connector system comprises: rotating connector 200, mating part 330 and double locking key 500. Rotating connector 200 is shown installed into mating part 330 in its final rotated position. The flanges 204 in rotating connector have mated with, and are hidden by, the channels 334 in mating part 330. Double locking key 500 is inserted into the rotating connector/mating part assembly in the direction of arrow d. Double locking key 500 has two locking tabs 550. Double locking key 500 locks rotating connector in place. Rotating connector is locked in place when locking tabs 550 are inserted into gap G. Locking tabs 550 fill gap G and prevent rotation of rotating connector 200 with respect to the mating part. FIG. 6 is a side view of a rotating connector system in an example embodiment of the invention. FIG. 6 shows double locking key 500 installed into the rotating connector/mating part assembly (330 and 200).

Figure 7:
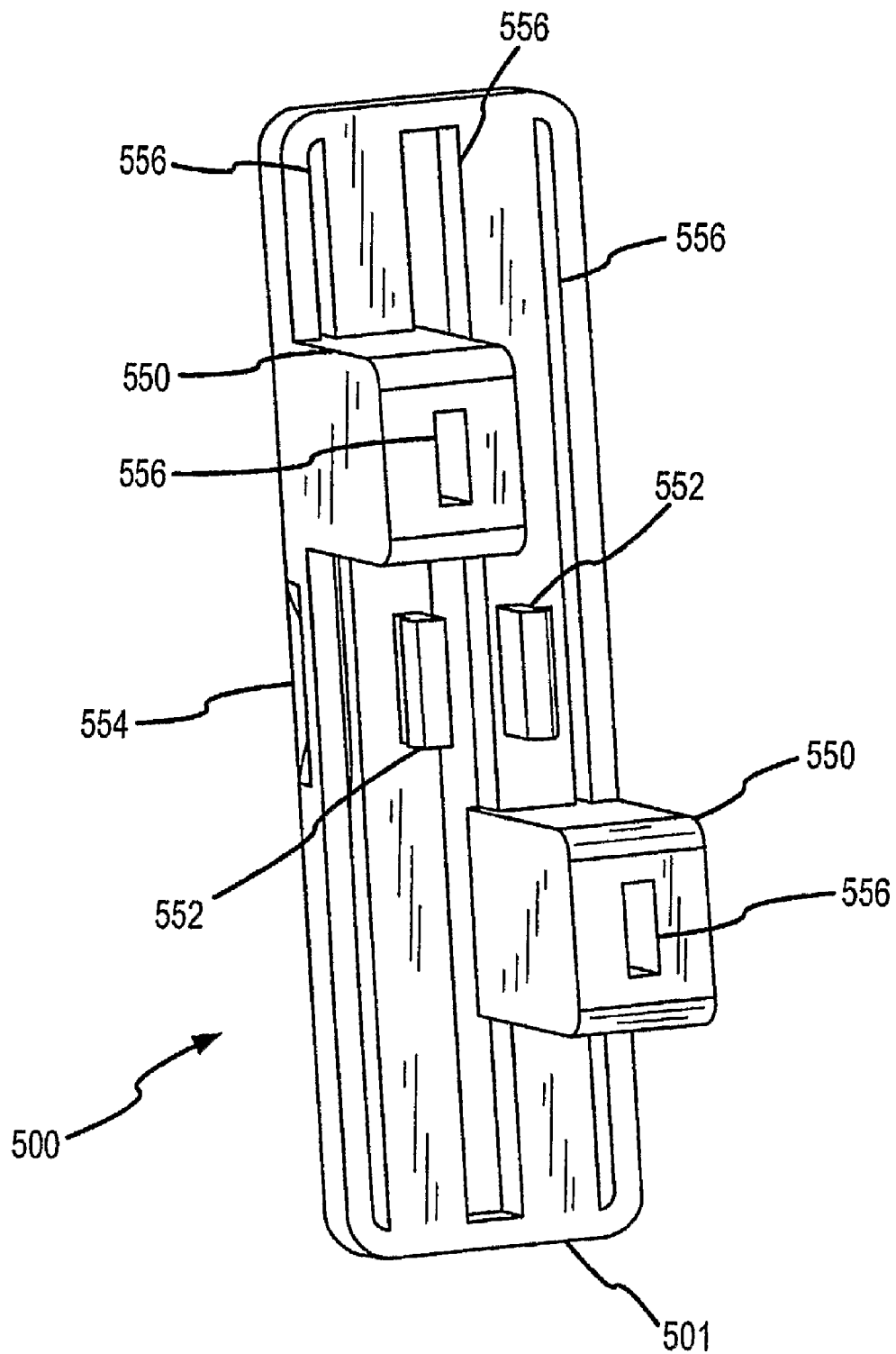
FIG. 7 is an isometric view of double locking key 500 in an example embodiment of the invention.

FIG. 7 is an isometric view of double locking key 500 in an example embodiment of the invention. Locking key 500 comprises a generally flat plate 501 having two locking tabs 550 extending from the front face of the flat plate 501. The two locking tabs 550 are offset from each other in both the horizontal and vertical directions. Two snaps 552 also extend from the front face of the flat plate 501. A pry slot 554 may be formed in each side of the flat plate 501. A plurality of optional voids 556 are formed in the flat plate 501 and in the two locking tabs 550 to reduce weight and to maintain proper wall thicknesses when the locking key is molded. The two locking tabs 550 are configured to fit into gap G formed between a rotating connector and a mating part when the rotating connector has been rotated into its final position with respect to the mating part. The two snaps 552 fit into, and lock against the inside of the snap opening 217 (FIG. 2a) in the side face of the rotating connector. Instead of snaps, locking key may use other well known methods for holding the locking key in place, for example a screw.

Figure 8:
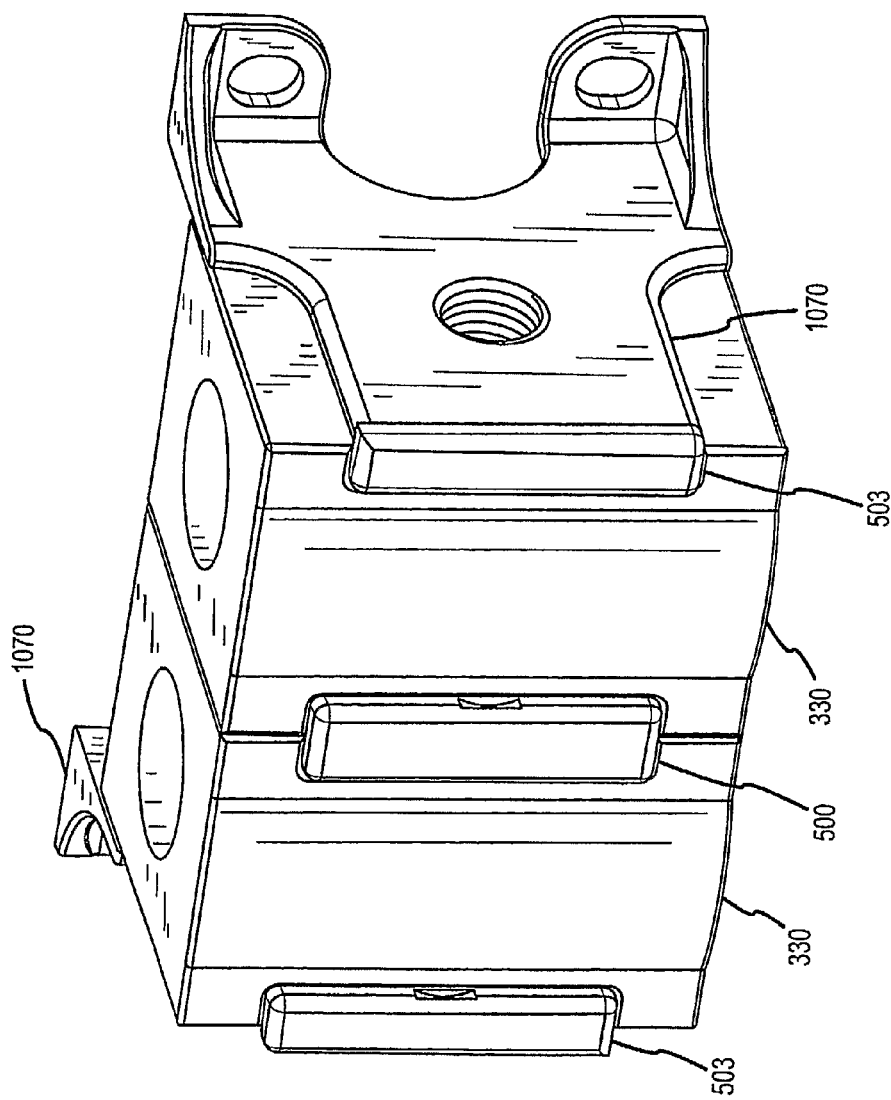
FIG. 8 is an isometric view of an assembly of mating parts held together by a connecting system in one example embodiment of the invention.

FIG. 8 is an isometric view of an assembly of mating parts or system components held together by a connecting system in one example embodiment of the invention. The assembly comprises two mating parts 330, rotating connector (not shown), two end caps 1070, double locking key 500 and two single locking keys 503. The two mating parts 330 are side by side with the rotating connector (not shown) between the two mating parts 330. Double locking key 500 is installed into the gaps between the rotating connector (not shown) and the two mating parts 330, locking the rotating connector in place. An end cap 1070 is attached to each end of the coupled mating parts 330. A single locking key 503 is installed into the gaps formed between each endcap 1070 and the corresponding mating part 330. Any number of additional mating parts may be added to the assembly to increase the number of parts joined together into one assembly.

Figure 9:
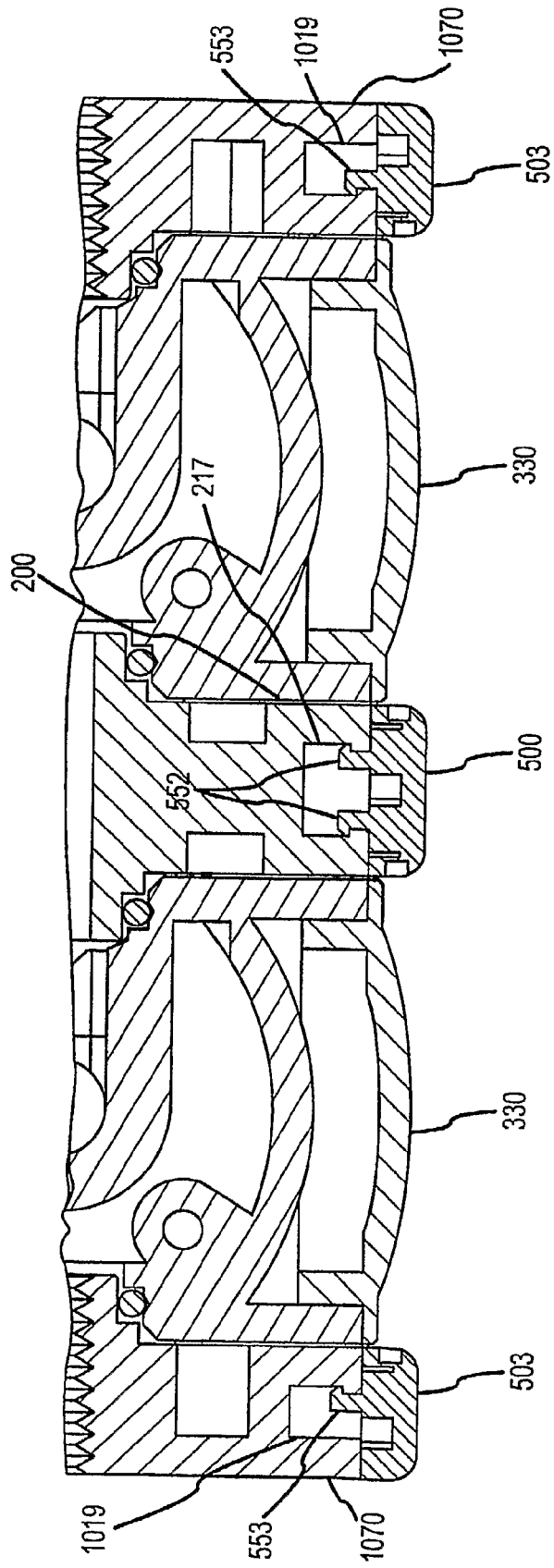
FIG. 9 is a cross sectional view of an assembly of mating parts held together by a connecting system in one example embodiment of the invention.

FIG. 9 is a cross sectional view of an assembly of mating parts held together by a connecting system in one example embodiment of the invention. The assembly comprises two mating parts 330, rotating connector 200, two end caps 1070, double locking key 500 and two single locking keys 503. The two mating parts 330 are side by side with the rotating connector 200 between the two mating parts 330. Double locking key 500 is installed into the gaps between the rotating connector 200 and the two mating parts 330, locking the rotating connector 200 in place. Snaps 552 are inserted into snap opening 217 formed into rotating connector 200, holding double locking key in place. An end cap 1070 is attached to each end of the coupled mating parts 330. A single locking key 503 is installed into the gaps formed between each endcap 1070 and the corresponding mating part 330. A snap 553 on each single locking key fits into, and locks against, a snap opening 1019 formed into each endcap 1070.

In general the rotary connector is designed to be rotated in a clockwise direction when being installed or locked in place into a mating part. The rotary connector may be configured to be installed or locked in place using a counter-clockwise motion.

At least two types of seals may be used between the rotating connector and the mating part. One type of seal is a face-to-face seal and another type of seal is a diameter seal. In one example embodiment of the invention, the face-to-face seal between the rotating connector and the mating part is formed by compressing an end face on the rotating connector against a face on the mating part. The compressive force is generated during the insertion of the rotating connector into the connector opening in the mating part. An O-ring or gasket may be mounted in the end face of the rotating connector or the end face of the mating part to help form the seal. In a diameter seal the compressive sealing force is developed by the clearance between an inner diameter of a bore and an outer diameter of a cylinder. An O-ring or gasket may be installed in the inner diameter of the bore or around the outer diameter of the cylinder to help form the seal.

In one example embodiment of the invention, the rotating connector may be configured as a step up or step down rotating connector. In the step up/down configuration the rotating connector would be used to connect together two components that have different flow path diameters, for example a ½ inch regulator with a ¼ inch lubricator. In one example embodiment of the invention the step up/down configuration is created by having a different outer diameter on the front and back side of the center section of the rotating connector. The flanges on the side of the connector with the larger outer diameter may also be larger.

In one example embodiment of the invention the rotating connector is configured as a zero space connector. Zero space connectors essentially do not add any space between the components joined together by the connector.

Figure 10:
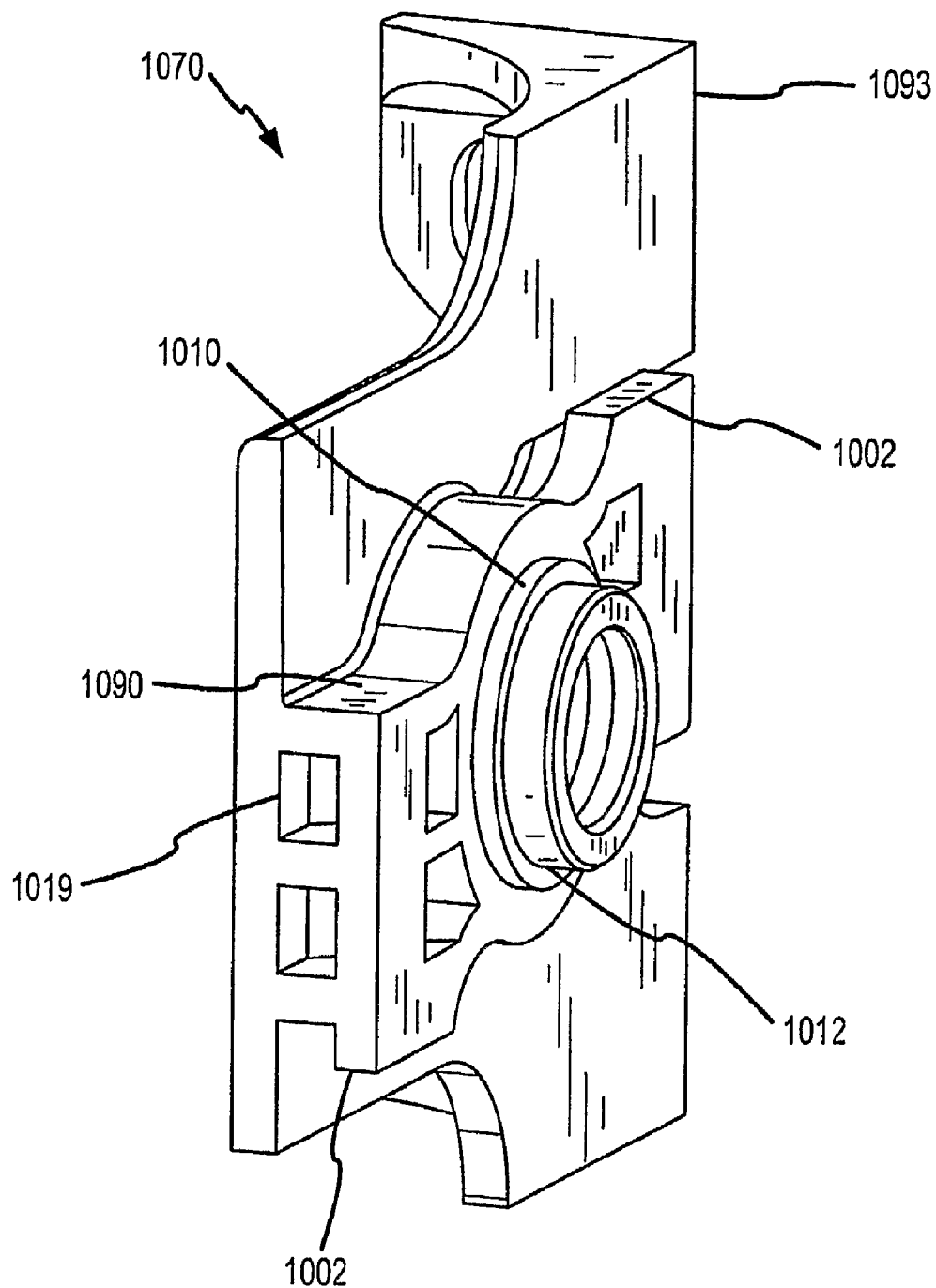
FIG. 10 is an isometric view of an endcap 1070 in an example embodiment of the invention.

FIG. 10 is an isometric view of an endcap 1070 in an example embodiment of the invention. In one example embodiment of the invention, the endcaps are the same shape as the rotating connectors on one end of the endcap and are configured to mate with the same connector openings in the system components. The endcaps have a plurality of different shapes on the other end of the endcaps. In one example embodiment of the invention, the endcaps are the same shape as the rotating connectors on one end with a variety of pipe threads formed in the inner bore of the other end of the endcap. This allows any component in the modular system having a connector opening to be fitted with any size and type of pipe thread by inserting the proper endcap into the connector opening. Stocking endcaps with a variety of pipe threads of different sizes is much cheaper than stocking a variety of components with different pipe threads.

In another example embodiment of the invention, a fitting is integrated into the other end of the endcap. The fitting may be any type of fitting, for example a quick connect fitting, a push to insert fitting, female quick connections, barb connections, swivel fittings, shut off valves, flow control valves, or the like. FIG. 10 is an isometric view of an endcap 1070 in an example embodiment of the invention. Endcap 1070 has a front side of the endcap forming one half of a rotating connector and the back half forming a mounting bracket 1093. The front side of endcap 1070 has a left and right wing forming two front flanges 1002. A snap opening 1019 may be formed on one or both sides of the endcap 1070. In use the end of the endcap 1070 that is shaped like one end of the rotating connector is inserted into a corresponding connector opening in a system component and rotated to fit the endcap in place. Once in place, the mounting bracket on the endcap can be used to mount the components onto a wall or support. Advantageously, the system component can be used in a system with a different connection scheme by switching out the endcap.

Figure 11:
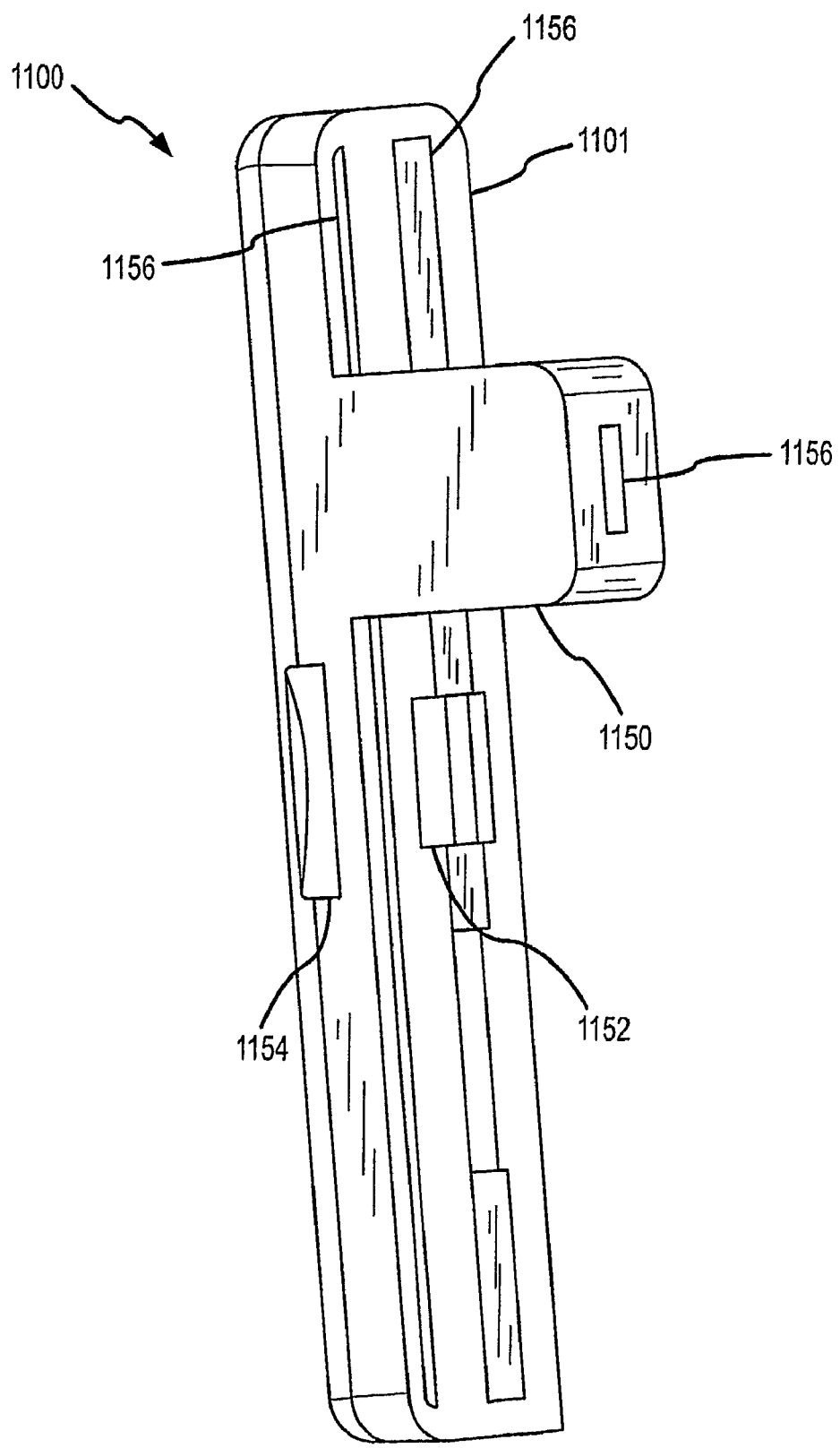
FIG. 11 is an isometric view of a single locking key 1100 in an example embodiment of the invention.

FIG. 11 is an isometric view of a single locking key 1100 in an example embodiment of the invention. Single locking key 1100 comprises a generally flat plate 1101 having a single locking tab 1150 extending from the front face of the flat plate 1101. The locking tab 1150 is offset from the center of the locking key in both the horizontal and vertical directions. A snap 1152 also extend from the front face of the flat plate 1101. A pry slot 1154 may be formed in each side of the flat plate 1101. A plurality of optional voids 1156 are formed in the flat plate and in the two locking tabs to reduce weight and to maintain proper wall thicknesses when the locking key is molded. The locking tab 1150 is configured to fit into gap G formed between a rotating connector on the one side of an endcap and a mating part when the endcap has been rotated into its final position with respect to the mating part. The snap 1152 fits into, and locks against, the inside of the snap opening 1019 in the side face of the endcap 1070.

Figure 12:
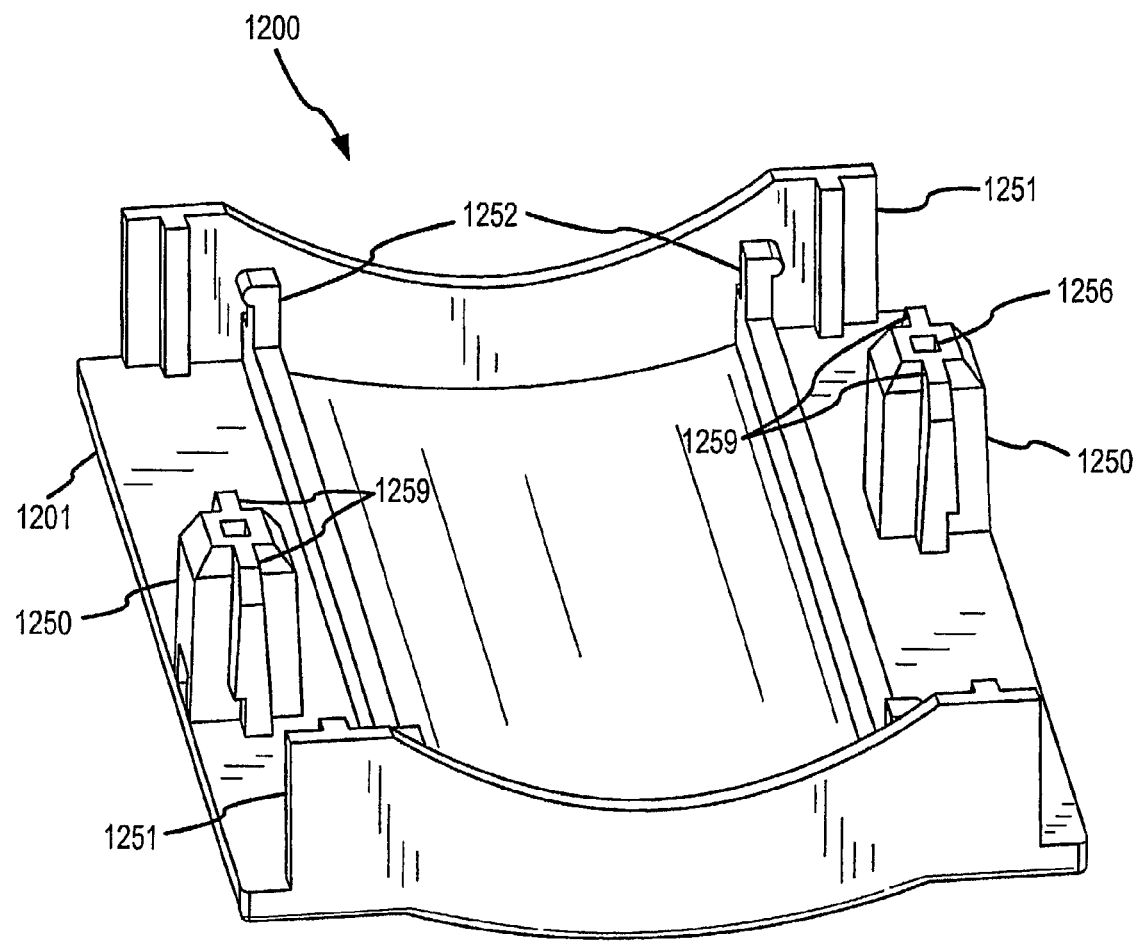
FIG. 12 is an isometric view of a cover 1200 for a system component in an example embodiment of the invention.

The locking tabs used to hold the rotating connector in place in the mating part are not limited to being located on a locking key. FIG. 12 is an isometric view of a cover 1200 for a system component in an example embodiment of the invention. Cover 1200 comprises a main body 1201, two side panels 1251, four snaps 1252, and two locking tabs 1250. The main body 1201 is in the general shape of a plate with the two side panels 1251 extending from the plate on the top and bottom side of the plate. The two locking tabs 1250 are attached to the front face of the main body 1201 and extend upward from the surface of the plate. Each locking tab may have voids 1256 formed into the locking tabs 1250 used to reduce weight and to maintain wall thickness. Locking tabs 1250 may have side flanges 1259 running along one or more sides of the locking tabs 1250. Side flanges 1259 fit into key slot 207 and key slot 337 when locking tab is inserted into gap G (see FIG. 4d). Side flanges 1259 may increase the maximum pressure the connector system can hold before failure. During use, cover 1200 is snapped onto the front face of a system component with the locking tabs 1250 inserted into gap G on either side of the system component, thereby locking the rotating connectors in place on each side of the system component.

I claim:

1. A modular coupling system, comprising:
    a connector (200, 201) having a generally cylindrical center section (224) with a bore (208) extending from a front face (206) of the connector (200, 201) through to a back side of the connector, the connector (200, 201) having a front half and a back half;
    the connector having a first (220) and a second wing (222) extending radially from the generally cylindrical center section (224) of the connector (200, 201);
    a first and second flange (202) on the front half of the connector where the first flange extends from a front side of the first wing (220) towards a top side of the connector and the second flange (202) extends from the front side of the second wing (222) towards a bottom side of the connector;
    a third and fourth flange (204) on the back half of the connector where the third flange (204) extends from a back side of the first wing (220) towards the bottom side of the connector, and the fourth flange (204) extends from the back side of the second wing (222) towards the top side of the connector; and
    where the first wing (220) and the second wing (222) extend in opposite directions from the generally cylindrical center section (224) of the connector.

2. The modular coupling system of claim 1 further comprising:
    a first shoulder (210) concentric with the bore (208) and extending above the front face (206) of the connector and a second shoulder concentric with the bore and extending above the back side of the connector.

3. The modular coupling system of claim 1 further comprising:
    a first snap opening in an end of the first wing;
    a second snap opening (217) an end of the second wing (222).

4. The modular coupling system of claim 1 where an inner surface (205) of the first, second, third and fourth flanges has been tilted away from vertical.

5. The modular coupling system of claim 1 further comprising:
    a first set of alignment tabs (280) located on an end of the first and second flanges (202) where a front face of the first set of alignment tabs extends above the front face (206) of the connector;
    a second set of alignment tabs (282) located on the ends of, and near a bottom surface of, the first and second flanges (202) where a front face of the second set of alignment tabs (282) extends above the front face (206) of the connector and where the front surface of the first set of alignment tabs (280) and the front surface of the second set of alignment tabs (282) form a plane.

6. The modular coupling system of claim 1 further comprising:
    a first set of alignment tabs (280) located on an end of the first and second flanges (202) where a top face of the first set of alignment tabs (280) is configured to align the connector (201) with respect to a mating part in rotation about a cylindrical axis of the bore (208).

7. The modular coupling system of claim 1 where a front half of the connector is a mirror image of the back half of the connector when rotated 180 degrees about an axis perpendicular to a cylindrical axis of the bore and parallel with the first and second wings.

8. The modular coupling system of claim 1 further comprising:
    two mating parts where each mating part has a connector opening where the connector opening comprises:
    a slot having a bottom surface (336) with a circular hole (332) formed in the bottom surface (336);
    the slot having a top edge forming an arcuate area in a middle section of the top edge where the area is concentric with the circular hole, a left side of the top edge forms a lug projecting downward from the edge where a channel is formed between the lug and the bottom surface of the slot;
    the slot having a bottom edge forming an arcuate area (338) in a middle section of the bottom edge where the area (338) is concentric with the circular hole (332), a right side of the bottom edge forms a lug (344) projecting upward from the edge where a channel (334) is formed between the lug (344) and the bottom surface (336) of the slot.

9. The modular coupling system of claim 8 where each mating part is selected from the group of: a filter, a regulator, a lubricator, a valve, a sensor, a pressure switch, a fluid control device and a fluid power device.

10. The modular coupling system of claim 8 further comprising:
    a locking tab (550) sized to fill a gap (G) formed between a bottom edge (292) of the first flange and the right side of the top edge (335) of the slot when the connector is installed in one of the two connector openings.

11. The modular coupling system of claim 10 where the locking tab (550) has at least one side flange (1259) running from a bottom of the locking tab to a top of the locking tab and configured to fit into a key slot (207, 337).

12. The modular coupling system of claim 10 where the locking tab is attached to a front face of a cover (1200).

13. The modular coupling system of claim 10 where the locking tab (550) is attached to a front face of a locking key (500, 1100).

14. The modular coupling system of claim 13 where a snap (552) is attached to the front face of the locking key (500, 1100).

15. The modular coupling system of claim 13 where a second locking tab (550) is attached to the front face of the locking key (500).

* * * * *